United States Patent [19]

Grumblatt

[11] 4,023,395
[45] May 17, 1977

[54] SYSTEM FOR SIMULATING PARAMETERS OF A TESTING DEVICE

[75] Inventor: James E. Grumblatt, St. Clair, Mich.

[73] Assignee: Selim R. Rahme, St. Clair Shores, Mich.

[22] Filed: Jan. 22, 1976

[21] Appl. No.: 651,510

[52] U.S. Cl. ................................................. 73/2
[51] Int. Cl.² ...................................... G01P 21/02
[58] Field of Search ..................... 73/1 R, 2, 432 R

[56] References Cited

UNITED STATES PATENTS 2,493,028  1/1950  Putt .......................................... 73/2
2,552,542  5/1951  Duerr ..................................... 73/2 X Primary Examiner—James J. Gill
Attorney, Agent, or Firm—Andrew R. Basile

[57] ABSTRACT

A system for simulating the parameters tested by a testing device is described. The testing device is used to verify that a sensor and tone wheel of an anti-skid system are properly functioning and connected. Accordingly, the testing device is used to check the resistance of the sensor, the level and frequency of the output voltage from the sensor, and whether the tone wheel has any missing teeth or is improperly aligned with respect to the sensor. The invention is directed to a system for simulating all these parameters to verify that the testing device is functioning properly.

11 Claims, 1 Drawing Figure

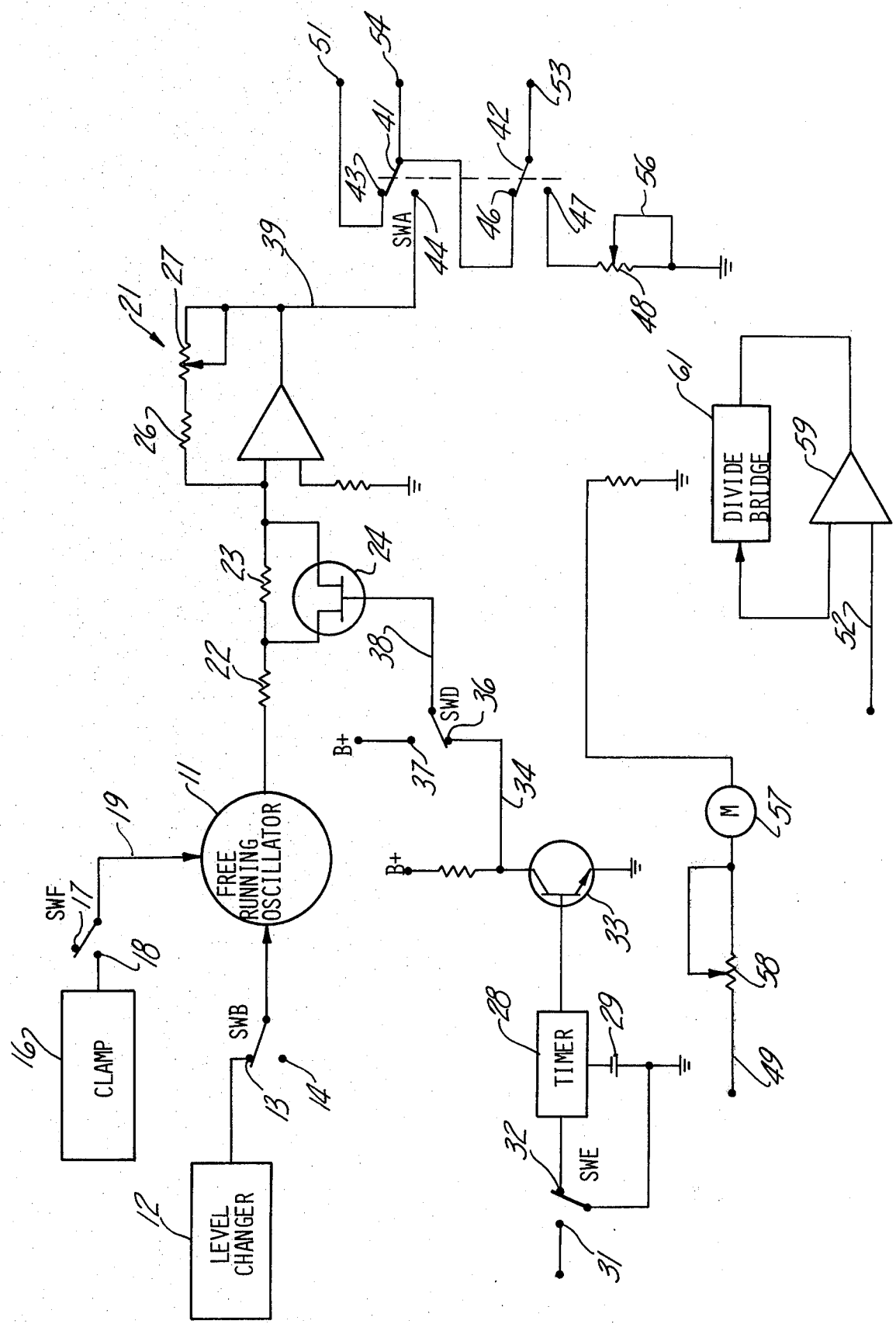

SYSTEM FOR SIMULATING PARAMETERS OF A TESTING DEVICE

BACKGROUND OF THE INVENTION

Anti-skid systems are used on land vehicles such as trucks to prevent the vehicle from skidding when the brakes are rapidly applied in an emergency situation or the roads are slippery or wet. Each wheel of the vehicle is equipped with a sensor which senses the speed of the wheel. The signal representative of the speed of the wheel is applied by a tone wheel which has a specified number of teeth, or webs. The sensor includes a coil, and the tone wheel is ferromagnetic so that the teeth of the wheel induce signals into the coil of the sensor. The output voltage of the sensor is therefore a sinusoidal wave, the frequency of which is directly proportional to the speed of the wheel. When the brakes of a vehicle are applied rapidly in emergency situations, the speed of the wheels should decrease substantially, rapidly, and very uniformly; however, if the vehicle is about to go into a spin, the one wheel locks, that is, the velocity goes to zero. The sensor associated with the locked wheel detects the absence of rotation and supplies a signal to the anti-skid system which then reacts to release the brake of the locked wheel and prevent the vehicle from going into a skid.

The invention described in application Ser. No. 632,095, filed Nov. 14, 1975, fully referenced hereinbelow, is directed to a system for varifying that the sensor and tone wheel of the anti-skid system are functioning and are connected properly. The testing system described in the cross-referenced patent application therefore measures the resistance of the sensor to make certain that the coil which responds to the webs of the tone wheel is proper and is supplying voltages of the proper level to the anti-skid system. The testing system also verifies that the tone wheel has no missing teeth, is properly aligned, and is the proper distance from the speed sensor. The invention described herein therefore simulates these signals to verify that the testing apparatus is properly functioning and yielding reject signals when signals indicative of a bad sensor or tone wheel should be yielded by the testing device. The invention is also useful in calibrating the testing system described in the cross-referenced application.

SUMMARY OF THE INVENTION

The invention includes a free-running oscillator which has a nominal output frequency of 30 hertz; however, the oscillator is voltage variable so that the output frequency is dependent upon the voltage level of the input to the oscillator. A level changer in the form of a ramp generator supplies an input voltage to the master oscillator so that the frequency of the oscillator is dependent upon the level of the ramp. Accordingly, the ramp is used to simulate the change of speed of the system being tested. A clamp circuit is provided to clamp the oscillator at a output frequency below a frequency which is indicative of 28 RPM to thereby enable varification that the system being tested will yield a fail signal when the tone wheel does not attain a preselected rotational speed, an exemplary preselected velocity is 28 RPM.

The inventive testing system also includes an amplifier which is used to adjust the peak-to-peak output voltage which will be indicative of a valid system. A timing device automatically provides a signal to a means which lowers the amplitude output of the amplifier. The decrease in output voltage of the amplifier is indicative of missing teeth in the tone wheel; and, accordingly, a pre-selected number of missing teeth can be simulated by the automatic timing of the timer.

Also included in the inventive system is a resistance test which is used to adjust the level of resistance which will cause a failure signal so that sensors having different coil resistances can be tested simply by adjusting the resistance level at which a failure would be indicated.

The inventive system also includes a means for monitoring the output signals from the test system being checked so that the peak-to-peak amplitude output and the tachometer output are continuously under monitor and can be adjusted to provide convenient and accurate testing.

The various aforementioned testing circuitry are interconnected through a switch which is conveniently operated from the panel of the inventive system.

CROSS REFERENCE TO RELATED APPLICATIONS

Application Ser. No. 632,095 filed on Nov. 14, 1975, by James E. Grumblatt, the inventor of the instant application, describes a testing system, the operability and functioning of which is verified by the instant invention.

BRIEF DESCRIPTION OF THE DRAWING

The FIGURE is a preferred embodiment of the invention.

DETAILED DESCRIPTION OF THE INVENTION

As shown in the FIGURE, the inventive system includes a free-running oscillator 11, the peak-to-peak amplitude output of which is fixed and the normal output frequency of which is 30 hertz. A level changer 12, in the form of a ramp generator, provides an input voltage to oscillator 11 through a switch SWB having contacts 13 and 14. When switch SWB is in a position such that the arm rests on contact 14, the output frequency of oscillator 11 will be 30 hertz; however, when switch SWB is in a condition such that the connector arm is in contact with contactor 13, the ramp output of level changer 12 is applied to the oscillator and, accordingly, the output frequency of oscillator 11 gradually rises from 0 to 30 hertz in accordance with the voltage of the ramp.

A clamping circuit 16 is also coupled to oscillator 11 through switch SWF having contacts 17 and 18. When the arm of switch SWF rests on contact 17, the clamp circuit is not coupled to the oscillator 11. However, when the switch is moved to position 18, the clamp circuit clamps the oscillator to an output frequency which is less than the frequency indicative of the preselected rotational velocity. Accordingly, this circuit is actuated to verify that the system under check will yield a low RPM signal when the tone wheel being tested does not reach the preselected rotational velocity, which in the preferred embodiment is 28 RPM.

The output of oscillator 11 is applied to an amplifier 21 through two resistors 22 and 23. Coupled across resistor 23 is a field effect transistor (FET) 24 which is normally conducting. Accordingly, ordinarily the output voltage from oscillator 11 is applied to the amplifier 21 over the resistor 22. Amplifier 21 is provided with a trimming potentiometer 27 which is used to adjust the output level of the system to any desired value.

A timer 28 is connected to ground through a capacitor 29. Associated with timer 28 is a switch SWE having two contacts 31 and 32. When switch SWE is in position 31, the charging and discharging of the capacitor effects the timing circuit and causes the output of the timer 28 to vary between zero and some preselected level. However, when the switch is on contact 32, capacitor 29 is shorted out, and the capacitor has no effect on timer 28. Timer 28 is connected to the base of transistor 33, the emitter of which is grounded. Transistor 33 is normally on but is turned on and off by the output from the timer 28. Accordingly, the charge and discharge of capacitor 29 turns transistor 33 on and off.

Lead 34 connects the collector of transistor 33 to contact 36 of a switch SWD to the control electrode of FET 24 by way of line 38. Contact 37 of the switch SWD connects the control electrode of FET 24 to the B+ source.

Amplifier 21 is connected to switch SWA by way of line 39. Switch SWA has two movable arms 41 and 42. Associated with arm 41 are two contacts 43 and 44, and associated with arm 42 are two contacts 46 and 47. Also associated with switch SWA are three terminals 51, 53, and 54. Terminal 51 receives the sensor signal from the testing system being checked and described in the cross-referenced application. Terminal 54 receives the input signal from the system described in the cross-referenced application, while input terminal 53 receives the resistance check signal of the sensor which also is received from the system being checked and which is described in the cross-referenced application.

The tachometer input available on lead 49 of the system described in the cross-referenced application is applied to a tachometer 57 through a potentiometer 58. Accordingly, the tachometer output of the system being tested can be continuously monitored. In a similar manner, the amplitude signal available on lead 52 of the system described in the cross-referenced application is applied to an operational amplifier 59 which is associated with a diode bridge 61. Diode bridge 61 has an ammeter connected across the diagonals thereof so that the peak-to-peak amplitude of the voltage available from the system being tested can be continuously monitored.

Before proceeding with a description of the operation of the inventive system, an understanding of the operation of the various switches included therein is beneficial. The type of switch used in a six-position switch, the various positions of which are coupled so that each new position cancels the preceding position and returns it to its normal condition. Such switches are available in the art as off-the-shelf items. The switch has six positions identified below, and the nomenclature utilized in the FIGURE is consistent with the following description:

SWA is a monitor position.
SWB is a calibrate position.
SWC is a test OK position.
SWD is a bad sensor position.
SWE is a bad tone wheel check.
SWF is a low RPM check.

It is to be emphasized that, as each of these positions are sequentially selected, the preceding position of the switch is changed so that the switch returns to its normal position. Also, the positions of the switches as illustrated in the FIGURE are representative of the monitor position.

As shown in the FIGURE, when the switch is set on the monitor position, which is SWA, input terminals 51, 53, and 54 are coupled through the switch arms 41 and 42. With the switch in the SWA position the peak-to-peak amplitude measuring circuitry and the RPM circuitry shown in the cross-referenced patent application are operative, but the other circuitry illustrated in the FIGURE is not connected into the system. This therefore simulates the dummy plug condition described in the cross-referenced application and demonstrates the fact that the inventive system can be coupled to the testing apparatus even when a sensor is being tested by the testing apparatus.

When the switch is placed on position SWB, which is the calibrate position, the arms 41 and 42 of SWA are respectively in contact with contactors 44 and 47. Accordingly, the circuitry illustrated in the FIGURE is coupled into the system. Also, switch SWB is on contact 14 so that oscillator 11 is disconnected from the ramp generator 12. The oscillator 11 therefore can now be adjusted to provide a normal output frequency of 30 hertz which simulates a 30 RPM revolution of a wheel being tested.

When the switch is placed on the SWC position, that is, a test OK position, switch SWB is returned to contact 13 so that the ramp generator 12 changes the output frequency of oscillator 11. Also, switch SWA is positioned such that contactors 41 and 42 respectively are in contact with contacts 44 and 47. Switches SWD, SWE, and SWF are then in the positions as shown in the FIGURE. With the switches in this position, the ramp output from level changer 12 changes the output frequency of oscillator 11 thereby simulating the rotation of the wheel from zero to 14 RPM and upwardly to 28 RPM. Also, the constant peak-to-peak amplitude voltage from oscillator 11 is applied to amplifier 21 through resistor 22. Accordingly, a valid peak-to-peak output from the sensor is simulated.

Because switch SWE is in position 32, the capacitor 29 associated with timer 28 is of no effect; and therefore transistor 33 remains conductive and is grounded. FET 24 therefore remains conductive despite the fact that the control electrode of FET 24 is connected to the collector of transistor 33 over lines 34 and 38 through position 36 of switch SWD.

When the switch is placed on the bad sensor position, which places switch SWD in contact with contactor 37 so that the B+ is applied to the control electrode of FET 24, the FET is rendered non-conductive, thereby adding resistor 23 and cutting the input voltage of amplifier 21 in half. This simulates the condition when a sensor is bad so that the output voltage thereof would not be of the proper peak-to-peak level. Accordingly, when the switch is in the SWD position, the checking system being tested should indicate a low-voltage output from the sensor.

When the switch is placed at the SWE position, switch SWD returns to contact 36, and switch SWE is set to contact 31. In this position the timer 28 is grounded through capacitor 29. Accordingly, as capacitor 29 charges and discharges in accordance with the RC constant of the timer and the capacitor 29, transistor 33 is turned on and off. Because of the connection of the collector of transistor 33 to the control electrode of FET 24, the turning on and off of transistor 33 also turns FET 24 on and off. This intermittently shorts out resistor 23 so that the output voltage of amplifier 21 is likewise intermittent. This simulates the condition when teeth are missing from the tone wheel of the system being tested. Therefore the checking system under test should yield an indication that there is a bad tone wheel.

When the switch is changed from position SWE to SWF, switch SWE returns to position 32 and switch SWF goes to position 18. Clamp circuit 16 then is connected to free-running oscillator 11. Clamp circuit 16 prevents the input voltage to oscillator 11 from reaching a level indicative of the preselected valid RPM of the tone wheel. Clamp circuit 16 therefore clamps the output frequency of oscillator 11 to a level which is indicative of something less than the preselected RPM (an examplary 28 RPM). Accordingly, the checking system under test should yield a signal which indicates that the tone wheel never reached 28 RPM so that the testing system should yield a low RPM rejection signal. The testing unit has now been completely checked and verified for proper functioning and can be used in the intended manner to, in turn, check anti-skid systems being applied to vehicles.

The invention is also useful in calibrating the testing device described in the cross-referenced application. Accordingly, the desired peak-to-peak amplitude signal which is indicative of a good sensor can be set by use of resistor 27 associated with amplifier 21. Also, potentiometer 48 can be adjusted by use of wiper 56 to calibrate the testing system described in the cross-referenced application for a particular sensor resistance.

I claim:

1. A checker for simulating the test parameters of a sensor and tone wheel associated with an anti-skid system; said checker comprising:
generator means for generating a signal simulating the rotational velocity of said tone wheel, the output frequency of the generator means representing said rotational velocity;
level changer means for controlling the output frequency of said generator means;
electric control means receiving the output of said generator means over an impedance;
means for selectively shorting at least some of said impendance;
and means for selectively preventing said generator means from providing an output above a predetermined frequency.

2. The system of claim 1 wherein said generator means is a voltage controlled oscillator.

3. The system of claim 2 wherein said level changer means is a ramp generator.

4. The system of claim 3 wherein said means for selectively shorting includes voltage responsive switching means and a timer for cyclically opening and closing said switching means to thereby vary said impedance.

5. The system of claim 4 wherein said means for preventing is a clamp circuit.

6. The system of claim 1 further including resistance check means.

7. The system of claim 5 further including resistance check means.

8. The system of claim 6 further including amplitude check means.

9. The system of claim 1 further including sequentially actuable switch means for sequentially rendering said level changer, said means for shorting and said means for preventing being independently operative to thereby simulate test conditions.

10. The system of claim 5 further including sequentially actuable switch means for sequentially rendering said level changer, said means for shorting and said means for preventing being independently operative to thereby simulate test conditions.

11. The system of claim 8 further including sequentially actuable switch means for sequentially rendering said level changer, said means for shorting, said means for preventing, said resistance check means, and amplitude check means operative to thereby sequentially simulate test conditions.

* * * * *